(12) United States Patent
Huang et al.

(10) Patent No.: US 12,457,383 B2
(45) Date of Patent: Oct. 28, 2025

(54) BULLET SCREEN PLAY METHOD, RELATED DEVICE, AND STORAGE MEDIUM

(71) Applicant: HUAWEI TECHNOLOGIES CO., LTD., Guangdong (CN)

(72) Inventors: Bingjie Huang, Shanghai (CN); Shuai Li, Shanghai (CN); Longhua Li, Shenzhen (CN); Shi Guo, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 415 days.

(21) Appl. No.: 18/187,440

(22) Filed: Mar. 21, 2023

(65) Prior Publication Data
US 2023/0232077 A1    Jul. 20, 2023

Related U.S. Application Data

(63) Continuation of application No. PCT/CN2021/117205, filed on Sep. 8, 2021.

(30) Foreign Application Priority Data

Sep. 22, 2020 (CN) .......................... 202011003984.0

(51) Int. Cl.
*H04N 21/4788* (2011.01)
*G06T 17/00* (2006.01)
(Continued)

(52) U.S. Cl.
CPC ......... *H04N 21/4788* (2013.01); *G06T 17/00* (2013.01); *G06T 19/00* (2013.01); *H04N 21/47217* (2013.01)

(58) Field of Classification Search
None
See application file for complete search history.

(56) References Cited

U.S. PATENT DOCUMENTS 11,706,496 B2 *  7/2023   Li ........................ H04N 21/462
                                                                    725/32

FOREIGN PATENT DOCUMENTS

CN         205038432 U  *  2/2016
CN         106210861 A     12/2016
(Continued)

OTHER PUBLICATIONS

Extended European Search Report in European Appln. No. 21871275.0, mailed on Jan. 22, 2024, 8 pages.

*Primary Examiner* — Saptarshi Mazumder
(74) *Attorney, Agent, or Firm* — Fish & Richardson P.C.

(57) ABSTRACT

Example bullet screen play methods and apparatus are described. One example bullet screen play method includes receiving a bullet screen enabling instruction for a target video, where the bullet screen enabling instruction instructs to play a bullet screen in a virtual reality (VR) bullet screen manner. An annular transparent bullet screen layer is drawn in a preset orientation of a video layer of the target video in response to the bullet screen enabling instruction, where a first height of the video layer is less than a second height of the bullet screen layer. Bullet screen information of a real-time bullet screen of the target video is obtained. Three-dimensional coordinates of the real-time bullet screen on the bullet screen layer are calculated based on the bullet screen information. The real-time bullet screen is refreshed and played on the bullet screen layer based on the three-dimensional coordinates.

20 Claims, 10 Drawing Sheets

(51) Int. Cl.
*G06T 19/00* (2011.01)
*H04N 21/472* (2011.01)

(56) References Cited

FOREIGN PATENT DOCUMENTS

| | | | | |
|---|---|---|---|---|
| CN | 106454387 A | | 2/2017 | |
| CN | 111586426 A | * | 8/2020 | ......... H04N 21/8153 |

* cited by examiner

BULLET SCREEN PLAY METHOD, RELATED DEVICE, AND STORAGE MEDIUM

CROSS-REFERENCE TO RELATED APPLICATIONS

This application is a continuation of International Application No. PCT/CN2021/117205, filed on Sep. 8, 2021, which claims priority to Chinese Patent Application No. 202011003984.0, filed on Sep. 22, 2020. The disclosures of the aforementioned applications are hereby incorporated by reference in their entireties.

TECHNICAL FIELD

This application relates to the field of virtual reality technologies, and in particular, to a bullet screen play method, a related device, and a storage medium.

BACKGROUND

With development of video technologies, bullet screens are everywhere in video playing. A user may discuss and communicate with another user by sending a bullet screen when watching a video. This manner increases entertainment interaction between a plurality of users.

However, it is found in practice that when bringing entertainment experience to people, bullet screen culture also brings some problems. For example, in some clips of a video, an entire screen is usually filled with bullet screens. As a result, a user cannot friendly experience content of a video clip when enjoying fun of bullet screens.

It can be learned that, in the current bullet screen form, watching effect of video content is poor.

SUMMARY

Embodiments of this application disclose a bullet screen play method, a related device, and a storage medium, to resolve a problem that watching effect of video content is poor due to an existing bullet screen representation form.

A first aspect of this application discloses a bullet screen play method. The method includes: receiving a bullet screen enabling instruction for a target video, where the bullet screen enabling instruction is used to instruct to play a bullet screen in a virtual reality VR bullet screen manner; drawing an annular transparent bullet screen layer in a preset orientation of a video layer of the target video in response to the bullet screen enabling instruction, where a first height of the video layer is less than a second height of the bullet screen layer; obtaining bullet screen information of a real-time bullet screen of the target video; calculating three-dimensional coordinates of the real-time bullet screen on the bullet screen layer based on the bullet screen information; and refreshing and playing the real-time bullet screen on the bullet screen layer based on the three-dimensional coordinates.

In this application, a VR virtual space is fully used to add the annular transparent bullet screen layer to the preset orientation of the video layer, and the height of the bullet screen layer is greater than the height of the video layer, to implement longitudinal extension and splitting of bullet screens in space, and eliminate a limitation of a screen of an electronic device, so that a proportion of bullet screens is greater than or equal to 100%. In this way, the bullet screens can be split longitudinally, bullet screen peak pressure is reduced, and watching effect of video content is improved.

In some optional implementations, after the drawing an annular transparent bullet screen layer in a preset orientation of a video layer of the target video, the method further includes: dividing the bullet screen layer into a newly-generated bullet screen region, a main screen bullet screen region, and a historical bullet screen region, where each real-time bullet screen crosses the newly-generated bullet screen region, the main screen bullet screen region, and the historical bullet screen region at a constant speed; initializing a bullet screen set in the newly-generated bullet screen region; determining whether initialization of the bullet screen set in the newly-generated bullet screen region is completed; and if initialization of the bullet screen set in the newly-generated bullet screen region is completed, performing the obtaining bullet screen information of a real-time bullet screen of the target video.

By using the initialization process, it can be ensured that at a moment t=0, a bullet screen enters from an entrance of a main screen of the main screen bullet screen region, and is displayed in the main screen bullet screen region.

In some optional implementations, the initializing a bullet screen set in the newly-generated bullet screen region includes: calculating an initialization time domain; obtaining the bullet screen set in the newly-generated bullet screen region within the initialization time domain; calculating initialization coordinates of each bullet screen in the bullet screen set; and displaying each bullet screen in the bullet screen set in the newly-generated bullet screen region based on the initialization coordinates.

In the initialization phase, each bullet screen displayed in the entire newly-generated bullet screen region is static and does not move, and each bullet screen is displayed at a fixed position in the newly-generated bullet screen region based on the initialization coordinates.

In some optional implementations, the initialization time domain is: $[0, \Delta t_1]$, where $$\Delta t_1 = \frac{(\alpha + \beta) \cdot \pi \cdot R}{180 \cdot v};$$

and the initialization coordinates are:

$$\begin{pmatrix} x \\ y \end{pmatrix} = \begin{pmatrix} R \cdot \cos\left[\alpha \cdot \left(1 - \frac{t}{\Delta t_1 - \Delta t_0}\right)\right] \\ R \cdot \sin\left[\alpha \cdot \left(1 - \frac{t}{\Delta t_1 - \Delta t_0}\right)\right] \end{pmatrix},$$

where $$\Delta t_0 = \frac{\beta \cdot \pi \cdot R}{180 \cdot v},$$

where v is a bullet screen movement speed, R is a radius of the bullet screen layer, α is an included angle between an entrance of the main screen bullet screen region and a horizontal direction, β is an included angle between a bullet screen generation position and the horizontal direction, and t is a particular moment.

In some optional implementations, the bullet screen information includes a bullet screen movement speed, a real-time play time, and a bullet screen height, and the calculating three-dimensional coordinates of the real-time bullet screen on the bullet screen layer based on the bullet screen information includes: calculating, at the real-time play time based on the bullet screen movement speed, a horizontal coordinate of the real-time bullet screen on a horizontal plane of the bullet screen layer; and calculating, at the real-time play time based on the bullet screen height, a vertical coordinate of the real-time bullet screen on a longitudinal plane of the bullet screen layer.

In some optional implementations, the calculating, at the real-time play time based on the bullet screen movement speed, a horizontal coordinate of the real-time bullet screen on a horizontal plane of the bullet screen layer includes: calculating, based on the bullet screen movement speed, a first time domain corresponding to the newly-generated bullet screen region, a second time domain corresponding to the main screen bullet screen region, and a third time domain corresponding to the historical bullet screen region; and if the real-time play time is within the first time domain, calculating a first horizontal coordinate of the real-time bullet screen in the newly-generated bullet screen region according to a first horizontal formula; or if the real-time play time is in the second time domain, calculating a second horizontal coordinate of the real-time bullet screen in the main screen bullet screen region according to a second horizontal formula; or if the real-time play time is within the third time domain, calculating a third horizontal coordinate of the real-time bullet screen in the historical bullet screen region according to a third horizontal formula.

A new bullet screen region is also extended horizontally on the bullet screen layer. When a user turns the head to the right, the user may watch the newly generated bullet screen in advance in the newly-generated bullet screen region, so that the user has a feeling of expectation. When turning the head to the left, the user may review a historical bullet screen in the historical bullet screen region, so that the user has a feeling of nostalgia, thereby enriching rendering forms of the bullet screen and improving user experience.

In some optional implementations, the first time domain is: $[0, \Delta t_1]$, where $$\Delta t_1 = \frac{(\alpha + \beta) \cdot \pi \cdot R}{180 \cdot v};$$

the first horizontal formula is:

$$\begin{pmatrix} x \\ y \end{pmatrix} = \begin{pmatrix} R \cdot \cos\left(\frac{\alpha \cdot t}{\Delta t_1 - \Delta t_0} - \beta\right) \\ R \cdot \sin\left(\frac{\alpha \cdot t}{\Delta t_1 - \Delta t_0} - \beta\right) \end{pmatrix},$$

where $$\Delta t_0 = \frac{\beta \cdot \pi \cdot R}{180 \cdot v};$$

the second time domain is:

$$\left[\Delta t_1, \Delta t_1 + \frac{W}{v}\right];$$

and the second horizontal formula is:

$$\begin{pmatrix} x \\ y \end{pmatrix} = \begin{pmatrix} \frac{w}{2} - v \cdot t + v \cdot t_1 \\ R \cdot \sin\alpha \end{pmatrix};$$

and
the third time domain is:

$$\left[\Delta t_1 + \frac{W}{v}, 2 \cdot \Delta t_1 + \frac{W}{v}\right];$$

and the third horizontal formula is:

$$\begin{pmatrix} x \\ y \end{pmatrix} = \begin{pmatrix} R \cdot \cos\left(\alpha - \left(t - \Delta t_1 - \frac{W}{v}\right) \cdot \frac{(\alpha + \beta)}{\Delta t_1}\right) \\ R \cdot \sin\left(\alpha - \left(t - \Delta t_1 - \frac{W}{v}\right) \cdot \frac{(\alpha + \beta)}{\Delta t_1}\right) \end{pmatrix},$$

where t is the real-time play time, v is the bullet screen movement speed, R is a radius of the bullet screen layer, $\alpha$ is an included angle between an entrance of the main screen bullet screen region and a horizontal direction, $\beta$ is an included angle between a real-time bullet screen generation position and the horizontal direction, W is a length of a main screen of the main screen bullet screen region, and $$\begin{pmatrix} x \\ y \end{pmatrix}$$

is the first horizontal coordinate or the second horizontal coordinate or the third horizontal coordinate.

In some optional implementations, the calculating, at the real-time play time based on the bullet screen height, a vertical coordinate of the real-time bullet screen on a longitudinal plane of the bullet screen layer includes: collecting statistics on a quantity of real-time bullet screens within the real-time play time; calculating a first spacing based on the quantity, a bullet screen height of each real-time bullet screen, and the first height of the video layer; calculating a second spacing based on the quantity, a bullet screen height of each real-time bullet screen, and the second height of the bullet screen layer; and if a preset spacing is less than or equal to the first spacing, calculating a first vertical coordinate of the real-time bullet screen on the longitudinal plane of the bullet screen layer according to a first longitudinal formula, where the preset spacing is a preset minimum spacing between two adjacent bullet screens that does not affect watching effect of the target video; or if the preset spacing is greater than or equal to the first spacing, and the preset spacing is less than or equal to the second spacing, calculating a second vertical coordinate of the real-time bullet screen on the longitudinal plane of the bullet screen layer according to a second longitudinal formula; or if the preset spacing is greater than the second spacing, calculating a third vertical coordinate of the real-time bullet screen on the longitudinal plane of the bullet screen layer according to a third longitudinal formula.

Compared with an original bullet screen region, a new bullet screen region is extended longitudinally, vertical coordinates are calculated based on a status of bullet screens that arrive at a same moment, and bullet screens are split longitudinally, to implement longitudinal dispersion of bullet screens during peak hours. In this way, the user can enjoy the content of a video clip when experiencing the bullet screens during peak hours.

In some optional implementations, the first spacing is:

$$\frac{H_o - \Sigma_{i=1}^{N} h_i}{N-1};$$

and the second spacing is:

$$\frac{H_{max} - \Sigma_{i=1}^{N} h_i}{N-1};$$

the first longitudinal formula is:

$$z_i = \frac{H_o}{2} - [\Sigma_{j=1}^{i-1} h_j + (i-1) \cdot d],$$

where $$d \in \left[ d_{min}, \frac{H_o - \Sigma_{i=1}^{N} h_i}{N-1} \right];$$

the second longitudinal formula is:

$$z_i = \frac{1}{2}\left[\Sigma_{j=1}^{N} h_j + (N-1) \cdot d\right] - \left[\Sigma_{j=1}^{i-1} h_j + (i-1) \cdot d\right],$$

where $$d \in \left[ \frac{H_o - \Sigma_{i=1}^{N} h_i}{N-1}, \frac{H_{max} - \Sigma_{i=1}^{N} h_i}{N-1} \right];$$

and
the third longitudinal formula is:

$$z_i = \frac{1}{2}\left[\Sigma_{j=1}^{N} h_j + (N-1) \cdot d\right] - \left[\Sigma_{j=1}^{i-1} h_j + (i-1) \cdot d\right],$$

where $$d = \frac{H_{max} - \Sigma_{k=1}^{N} h_i}{N-1};$$

and
N is a quantity of real-time bullet screens that arrive at the real-time play time, $h_i$ is a bullet screen height of an $i^{th}$ real-time bullet screen, $h_j$ is a bullet screen height of a $j^{th}$ real-time bullet screen, $H_0$ is the first height, $H_{max}$ is the second height, d is a spacing between two adjacent real-time bullet screens, $d_{min}$ is the preset spacing, and $z_i$ is the first vertical coordinate or the second vertical coordinate or the third vertical coordinate.

In some optional implementations, the drawing an annular transparent bullet screen layer in a preset orientation of a video layer of the target video in response to the bullet screen enabling instruction includes: outputting a bullet screen layer editing page in response to the bullet screen enabling instruction; receiving a bullet screen layer drawing parameter input on the bullet screen layer editing page; and drawing the annular transparent bullet screen layer in the preset orientation of the video layer of the target video based on the bullet screen layer drawing parameter.

The bullet screen layer drawing parameter may include but is not limited to: a height of the bullet screen layer, a radius of the bullet screen layer, and a radian of the bullet screen layer. These bullet screen layer drawing parameters are all adjustable. The user can customize a bullet screen shape suitable for the user by adjusting the bullet screen layer drawing parameter.

A second aspect of this application discloses an electronic device, including a processor and a memory. The memory is configured to store instructions, and the processor is configured to invoke the instructions in the memory, to enable the electronic device to perform the bullet screen play method.

A third aspect of this application discloses a bullet screen play system. The bullet screen play system includes an electronic device and a portable device. The electronic device is configured to perform the bullet screen play method.

A fourth aspect of this application discloses a computer-readable storage medium. The computer-readable storage medium stores at least one instruction. When the at least one instruction is executed by a processor, the bullet screen play method is implemented.

DESCRIPTION OF EMBODIMENTS

The following describes embodiments of this application with reference to the accompanying drawings in embodiments of this application.

To better understand a bullet screen play method, a related device, and a storage medium disclosed in embodiments of this application, the following first describes a network architecture to which embodiments of this application are applicable.

Figure 1A:
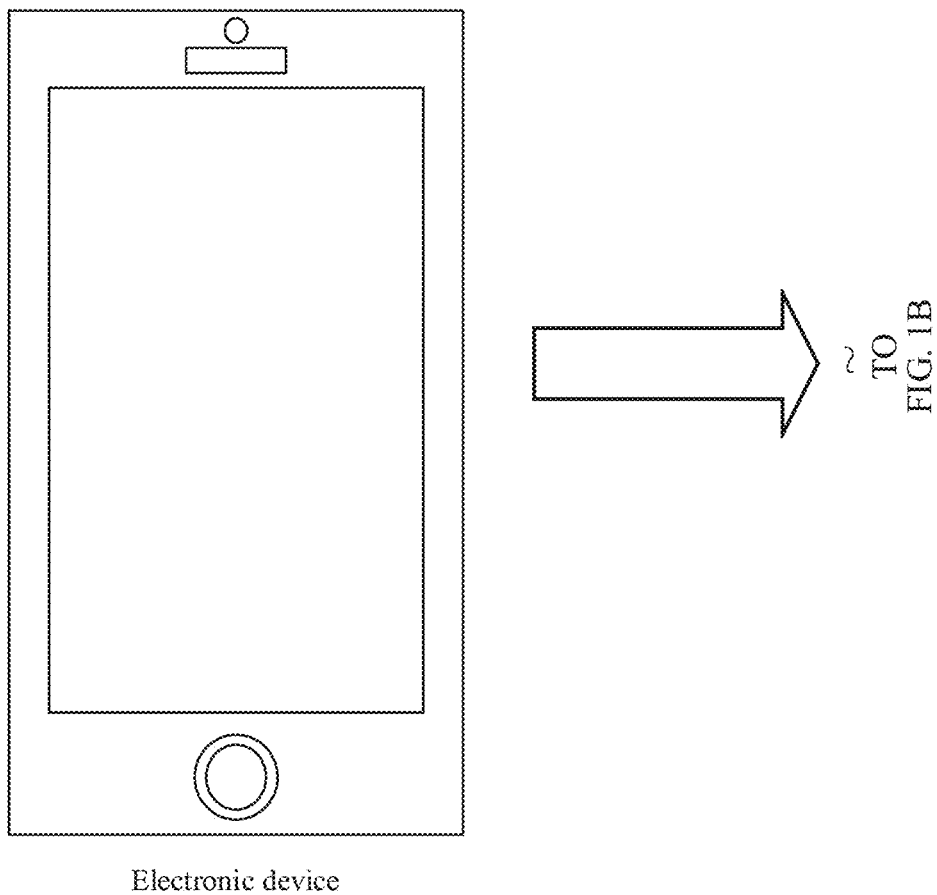
FIG. 1A, FIG. 1B, and FIG. 1C are a schematic diagram of a framework of a bullet screen play system according to an embodiment of this application.
Figure 1B:
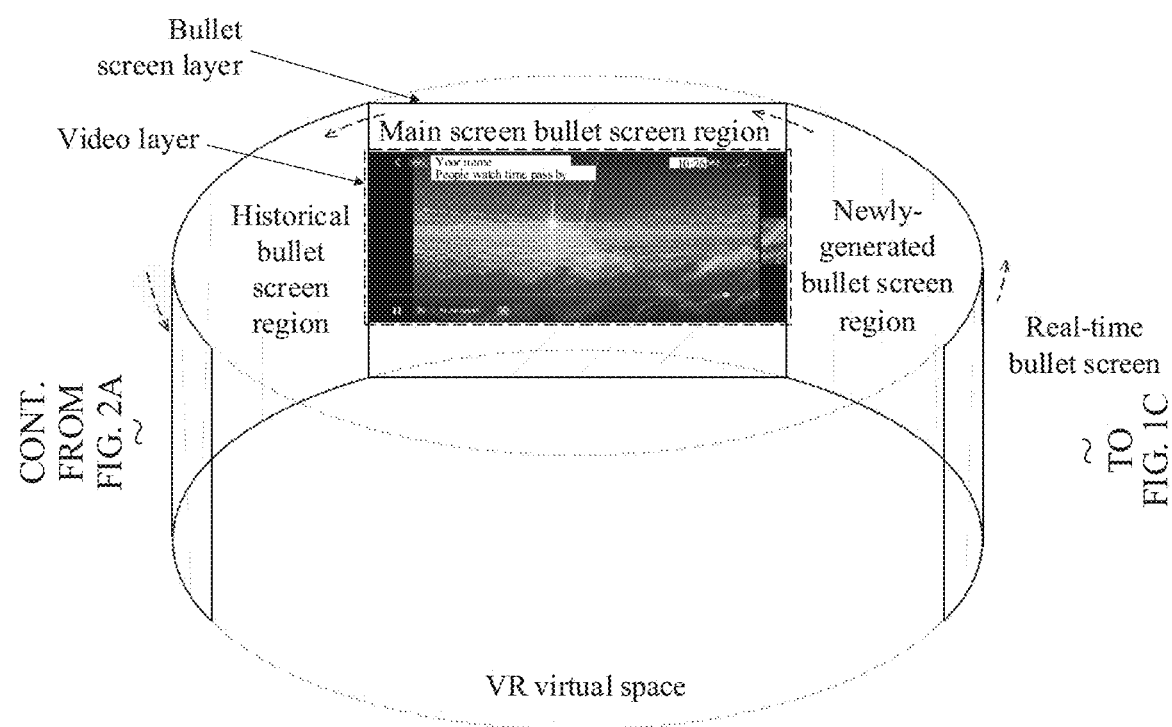
Figure 1C:
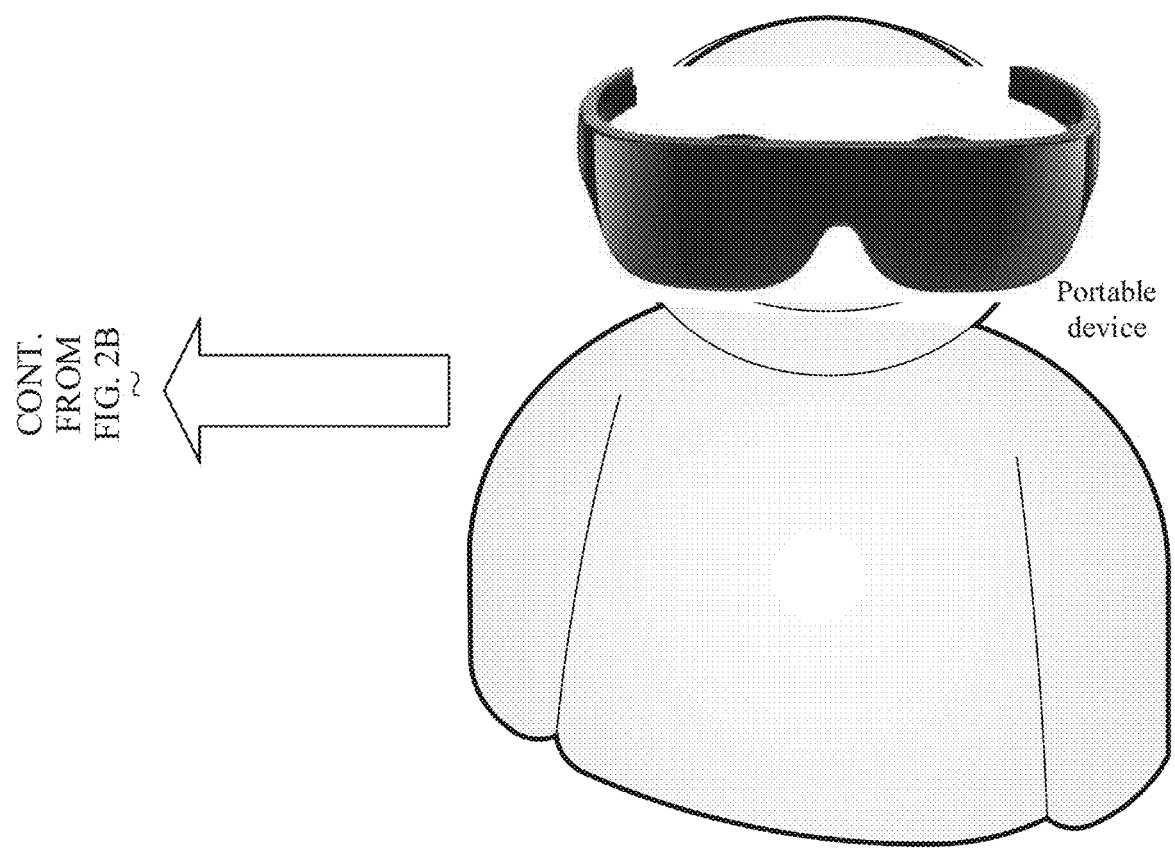

FIG. 1A, FIG. 1B, and FIG. 1C are a schematic diagram of a framework of a bullet screen play system according to an embodiment of this application. As shown in FIG. 1A, FIG. 1B, and FIG. 1C, the bullet screen play system includes an electronic device and a portable device. FIG. 1A, FIG. 1B, and FIG. 1C further include a bullet screen layer and a video layer that are rendered in VR virtual space.

The electronic device may include, but is not limited to, a smartphone, a tablet computer, and a personal digital assistant PDA. A virtual reality (Virtual Reality, VR) application (Application, APP) is installed on the electronic device, and a VR SDK (Software Development Kit, software development kit) is integrated in the VR APP. A drawing capability of a VR bullet screen layer and a capability of calculating and refreshing a bullet screen position in real time are integrated in the VR SDK. After a user taps to start the VR APP, the electronic device may draw a video layer in a VR virtual space and play a video. If the user chooses to play a bullet screen in a VR bullet screen manner, the electronic device may obtain, by using the VR SDK, a bullet screen layer drawing parameter (for example, a height of the bullet screen layer, a radius of the bullet screen layer, and a radian of the bullet screen layer) set by the user, and draw an annular transparent bullet screen layer above the video layer based on the bullet screen layer drawing parameter. The height of the bullet screen layer is greater than or equal to a height of the video layer. When a bullet screen needs to be played, bullet screen information (such as bullet screen content, a bullet screen height, and a bullet screen movement speed) of each real-time bullet screen is transferred to the VR SDK. The VR SDK may calculate three-dimensional coordinates of each bullet screen in real time. Finally, the real-time bullet screen may be refreshed and played on the drawn bullet screen layer in the VR virtual space based on the three-dimensional coordinates.

The bullet screen layer drawn in the VR virtual space may be divided into a plurality of regions, for example, a newly-generated bullet screen region, a main screen bullet screen region, and a historical bullet screen region. Each newly generated real-time bullet screen appears from the newly-generated bullet screen region, moves at a constant speed to the main screen bullet screen region, and then moves to the historical bullet screen region and disappears.

The portable device may be VR glasses. After wearing the VR glasses, the user can see a real-time bullet screen rendered in the VR virtual space.

In the bullet screen play system described in FIG. 1A, FIG. 1B, and FIG. 1C, a bullet screen region gets rids of a limitation of a screen of the electronic device, and the height of the bullet screen layer is greater than the height of the video layer. A regional area of the video layer is an area of the screen. Compared with an original bullet screen region, a new bullet screen region is extended longitudinally on the bullet screen layer in FIG. 1A, FIG. 1B, and FIG. 1C, and may be used to implement longitudinal dispersion of bullet screens during peak hours, so that the user enjoys content of a wonderful video clip when experiencing bullet screens during peak hours. In addition, a new bullet screen region is also extended horizontally on the bullet screen layer. When the user turns the head to the right, the user may watch the newly generated bullet screen in advance in the newly-generated bullet screen region, so that the user has a feeling of expectation. When the user turns the head to the left, the user may review a historical bullet screen in the historical bullet screen region, so that the user has a feeling of nostalgia. Therefore, by using the bullet screen form shown in FIG. 1A, FIG. 1B, and FIG. 1C, bullet screens can be split longitudinally, to reduce pressure of a bullet screen peak, and improve watching effect of video content. In addition, a rendering form of bullet screens can also be enriched, to improve user experience.

Based on the foregoing embodiment, the following describes a bullet screen play method in embodiments of this application.

Figure 2:
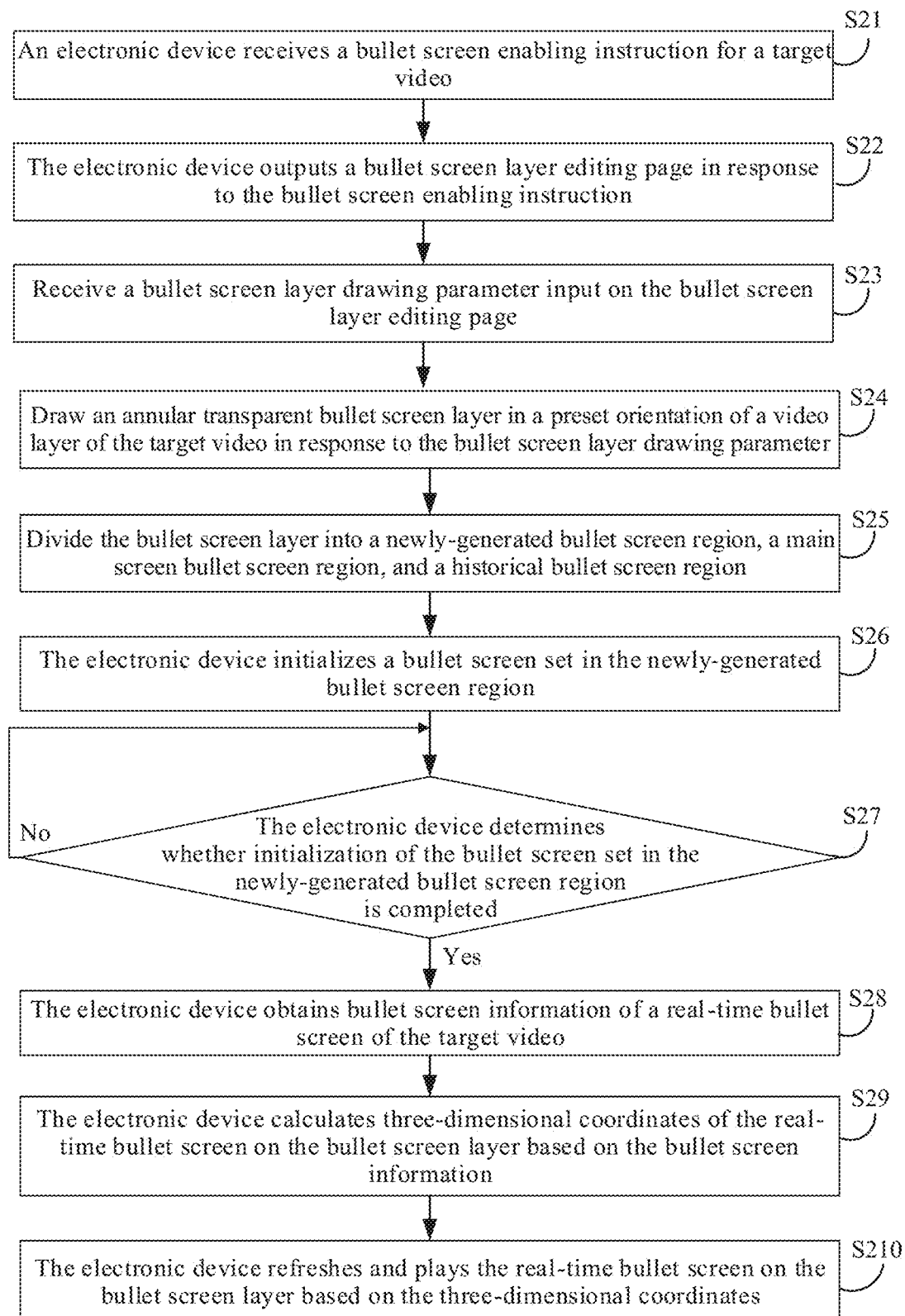
FIG. 2 is a schematic flowchart of a bullet screen play method according to an embodiment of this application.

FIG. 2 is a schematic flowchart of a bullet screen play method according to an embodiment of this application. The bullet screen play method shown in FIG. 2 is applied to the electronic device shown in FIG. 1A, FIG. 1B, and FIG. 1C, and the method includes the following steps.

S21: The electronic device receives a bullet screen enabling instruction for a target video.

In this embodiment of this application, the electronic device may receive the bullet screen enabling instruction that is for the target video and that is sent by another device (for example, a handle). The bullet screen enabling instruction is used to instruct to play a bullet screen in a virtual reality VR bullet screen manner.

Before step S21, the electronic device may draw a video layer in a VR virtual space and play the target video. The user may watch, by wearing a portable device (for example, VR glasses), the target video rendered on the video layer.

S22: The electronic device outputs a bullet screen layer editing page in response to the bullet screen enabling instruction.

The electronic device may output the bullet screen layer editing page in the VR virtual space, and the user may set a bullet screen layer drawing parameter on the bullet screen layer editing page. The bullet screen layer drawing parameter may include but is not limited to: a height of the bullet screen layer, a radius of the bullet screen layer, and a radian of the bullet screen layer. These bullet screen layer drawing parameters are all adjustable. The user can customize a bullet screen shape suitable for the user by adjusting the bullet screen layer drawing parameter.

S23: The electronic device receives a bullet screen layer drawing parameter input on the bullet screen layer editing page.

S24: The electronic device draws an annular transparent bullet screen layer in a preset orientation of a video layer of the target video based on the bullet screen layer drawing parameter.

Figure 2A:
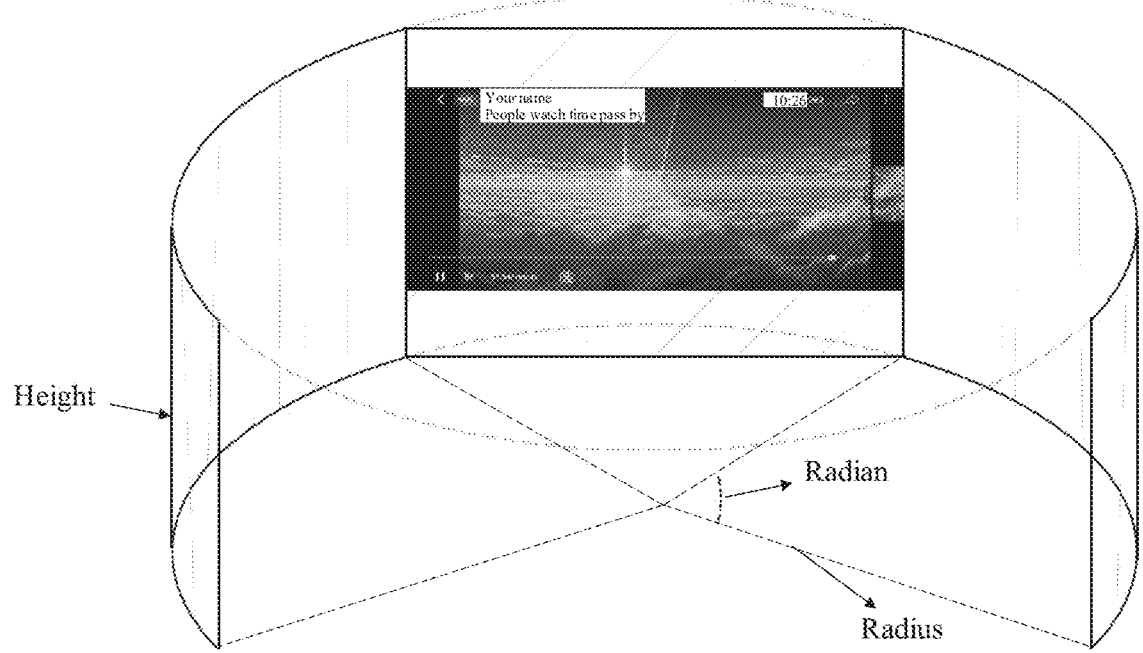
FIG. 2A is a schematic diagram of a bullet screen layer drawing parameter according to an embodiment of this application.

The bullet screen layer drawn based on the bullet screen layer drawing parameter (the height, the radian, and the radius) is shown in FIG. 2A. The bullet screen layer is of an annular structure, and the bullet screen layer has extension regions in both a longitudinal direction and a horizontal direction of the video layer. The preset orientation is, for example, above the video layer. A first height of the video layer is less than a second height of the bullet screen layer. A regional area of the entire bullet screen layer is greater than a regional area of the video layer.

S25: The electronic device divides the bullet screen layer into a newly-generated bullet screen region, a main screen bullet screen region, and a historical bullet screen region.

Each newly generated bullet screen crosses the newly-generated bullet screen region, the main screen bullet screen region, and the historical bullet screen region at a constant speed.

S26: The electronic device initializes a bullet screen set in the newly-generated bullet screen region.

In this embodiment of this application, before the target video starts to be played, the bullet screen set in the newly-generated bullet screen region needs to be initialized and displayed in the entire newly-generated bullet screen region. In this way, it can be ensured that at a moment t=0, a bullet screen enters from an entrance of a main screen of the main screen bullet screen region, and is displayed in the main screen bullet screen region.

Figure 2B:
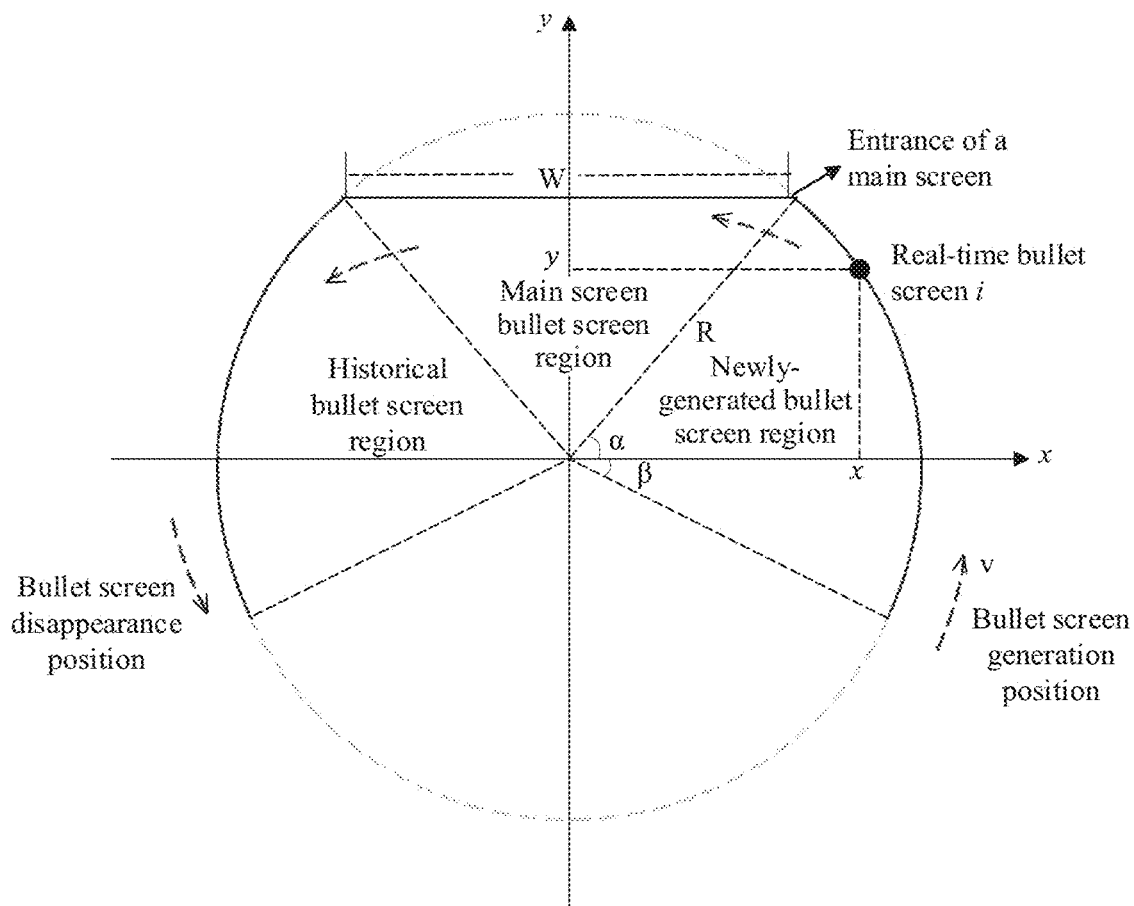
FIG. 2B is a schematic diagram of coordinates of a bullet screen moving on a horizontal plane according to an embodiment of this application.

FIG. 2B is a schematic diagram of coordinates of a bullet screen moving on a horizontal plane according to an embodiment of this application. v is a bullet screen movement speed, R is a radius of the bullet screen layer, $\alpha$ is an included angle between an entrance of the main screen bullet screen region and a horizontal direction, $\beta$ is an included angle between a bullet screen generation position and the horizontal direction, and t is a particular moment. $\alpha$ and $\beta$ are radians in the bullet screen drawing parameter, and may be adjusted based on a requirement of the user.

Each bullet screen starts to move from the bullet screen generation position. Before the target video starts to be played, the bullet screen set in the entire newly-generated bullet screen region is initialized. When the target video is played, a real-time bullet screen i starts to be displayed in the newly-generated bullet screen region, and the real-time bullet screen i moves to the entrance of the main screen, enters the main screen bullet screen region from the entrance of the main screen, then moves to the historical bullet screen region, and finally disappears from a bullet screen disappearance position.

Specifically, the initializing a bullet screen set in the newly-generated bullet screen region includes:
calculating an initialization time domain;
obtaining the bullet screen set in the newly-generated bullet screen region within the initialization time domain;
calculating initialization coordinates of each bullet screen in the bullet screen set; and
displaying each bullet screen in the bullet screen set in the newly-generated bullet screen region based on the initialization coordinates.

The initialization time domain is: [0, $\Delta t_1$], where $$\Delta t_1 = \frac{(\alpha + \beta) \cdot \pi \cdot R}{180 \cdot v};$$

and
the initialization coordinates are:

$$\begin{pmatrix} x \\ y \end{pmatrix} = \begin{pmatrix} R \cdot \cos\left[\alpha \cdot \left(1 - \frac{t}{\Delta t_1 - \Delta t_0}\right)\right] \\ R \cdot \sin\left[\alpha \cdot \left(1 - \frac{t}{\Delta t_1 - \Delta t_0}\right)\right] \end{pmatrix},$$

where $$\Delta t_0 = \frac{\beta \cdot \pi \cdot R}{180 \cdot v}.$$

It should be noted that, in the initialization phase, each bullet screen displayed in the entire newly-generated bullet screen region is static and does not move, and each bullet screen is displayed at a fixed position in the newly-generated bullet screen region based on the initialization coordinates. After the initialization is completed, when the target video starts to be played, the bullet screen in the newly-generated bullet screen region starts to move in real time, and corresponding position coordinates change accordingly.

S27: The electronic device determines whether the initialization of the bullet screen set in the newly-generated bullet screen region is completed, and if the initialization of the bullet screen set in the newly-generated bullet screen region is completed, performs step S28, or if the initialization of the bullet screen set in the newly-generated bullet screen region is not completed, performs step S27 repeatedly.

In this embodiment of this application, only after the initialization of the bullet screen set in the newly-generated bullet screen region is completed, it can be ensured that at the moment t=0, a bullet screen enters the main screen bullet screen region for display from the entrance of the main screen. If the initialization is not completed, initialization needs to be repeatedly performed, until the initialization is completed.

S28: The electronic device obtains bullet screen information of a real-time bullet screen of the target video.

The bullet screen information may include but is not limited to: bullet screen content, a bullet screen movement speed, a real-time play time, a bullet screen height, an original bullet screen position, and a bullet screen height.

S29: The electronic device calculates three-dimensional coordinates of the real-time bullet screen on the bullet screen layer based on the bullet screen information.

The bullet screen information includes a bullet screen movement speed, a real-time play time, and a bullet screen height, and the calculating three-dimensional coordinates of the real-time bullet screen on the bullet screen layer based on the bullet screen information includes:

(11) calculating, at the real-time play time based on the bullet screen movement speed, a horizontal coordinate of the real-time bullet screen on a horizontal plane of the bullet screen layer; and

(12) calculating, at the real-time play time based on the bullet screen height, a vertical coordinate of the real-time bullet screen on a longitudinal plane of the bullet screen layer.

The three-dimensional coordinates refer to three-dimensional coordinates of the bullet screen on the bullet screen layer in the VR virtual space at the moment of the real-time play time t, and include the horizontal coordinate on the horizontal plane and the vertical coordinate on the longitudinal plane.

In an optional implementation, in step (11), the calculating, at the real-time play time based on the bullet screen movement speed, a horizontal coordinate of the real-time bullet screen on a horizontal plane of the bullet screen layer includes:
calculating, based on the bullet screen movement speed, a first time domain corresponding to the newly-generated bullet screen region, a second time domain corresponding to the main screen bullet screen region, and a third time domain corresponding to the historical bullet screen region; and
if the real-time play time is within the first time domain, calculating a first horizontal coordinate of the real-time bullet screen in the newly-generated bullet screen region according to a first horizontal formula; or
if the real-time play time is in the second time domain, calculating a second horizontal coordinate of the real-time bullet screen in the main screen bullet screen region according to a second horizontal formula; or if the real-time play time is within the third time domain, calculating a third horizontal coordinate of the real-time bullet screen in the historical bullet screen region according to a third horizontal formula.

The first time domain is a time range in which the real-time bullet screen moves in the newly-generated bullet screen region, the second time domain is a time range in which the real-time bullet screen moves in the main screen bullet screen region, and the third time domain is a time range in which the real-time bullet screen moves in the historical bullet screen region.

Each time domain and formula in this optional implementation may be understood with reference to FIG. 2B. A time $\Delta t_1$ for the real-time bullet screen i to move from the bullet screen generation position to the entrance of the main screen, a time $(\Delta t_1 + W/v)$ for the real-time bullet screen i to leave the main screen bullet screen region and enter the historical bullet screen region, and a time $$\left(2\Delta t_1 + \frac{W}{v}\right)$$

for the real-time bullet screen i to disappear at the bullet screen disappearance position can be calculated based on each bullet screen layer drawing parameter ($\alpha$, $\beta$, R, v) in FIG. 2B, and a horizontal position coordinate (x,y) of the real-time bullet screen i at each real-time play time is calculated.

Formulas for calculating the time domain and the horizontal coordinate of the real-time bullet screen i in each bullet screen region are as follows:

(1) Newly-generated bullet screen region:
the first time domain is: $[0, \Delta t_1]$, where $$\Delta t_1 = \frac{(\alpha + \beta) \cdot \pi \cdot R}{180 \cdot v};$$

and
the first horizontal formula is:

$$\begin{pmatrix} x \\ y \end{pmatrix} = \begin{pmatrix} R \cdot \cos\left(\frac{\alpha \cdot t}{\Delta t_1 - \Delta t_0} - \beta\right) \\ R \cdot \sin\left(\frac{\alpha \cdot t}{\Delta t_1 - \Delta t_0} - \beta\right) \end{pmatrix},$$

where $$\Delta t_0 = \frac{\beta \cdot \pi \cdot R}{180 \cdot v}.$$

(2) Main screen bullet screen region:
the second time domain is:

$$\left[\Delta t_1, \Delta t_1 + \frac{W}{v}\right];$$

and
the second horizontal formula is:

$$\begin{pmatrix} x \\ y \end{pmatrix} = \begin{pmatrix} \frac{W}{2} - v \cdot t + v \cdot t_1 \\ R \cdot \sin\alpha \end{pmatrix}.$$

(3) Historical bullet screen region:
the third time domain is:

$$\left[\Delta t_1 + \frac{W}{v}, 2 \cdot \Delta t_1 + \frac{W}{v}\right];$$

and
the third horizontal formula is:

$$\begin{pmatrix} x \\ y \end{pmatrix} = \begin{pmatrix} R \cdot \cos\left(\alpha - \left(t - \Delta t_1 - \frac{W}{v}\right) \cdot \frac{(\alpha + \beta)}{\Delta t_1}\right) \\ R \cdot \sin\left(\alpha - \left(t - \Delta t_1 - \frac{W}{v}\right) \cdot \frac{(\alpha + \beta)}{\Delta t_1}\right) \end{pmatrix}.$$

t is the real-time play time, v is the bullet screen movement speed, R is a radius of the bullet screen layer, $\alpha$ is an included angle between an entrance of the main screen bullet screen region and a horizontal direction, $\beta$ is an included angle between a real-time bullet screen generation position and the horizontal direction, W is a length of a main screen of the main screen bullet screen region, and $$\begin{pmatrix} x \\ y \end{pmatrix}$$

is the first horizontal coordinate or the second horizontal coordinate or the third horizontal coordinate.

In an optional implementation, in step (12), the calculating, at the real-time play time based on the bullet screen height, a vertical coordinate of the real-time bullet screen on a longitudinal plane of the bullet screen layer includes:

collecting statistics on a quantity of real-time bullet screens within the real-time play time;

calculating a first spacing based on the quantity, a bullet screen height of each real-time bullet screen, and the first height of the video layer;

calculating a second spacing based on the quantity, a bullet screen height of each real-time bullet screen, and the second height of the bullet screen layer, where the second height is greater than or equal to the first height;

if a preset spacing is less than or equal to the first spacing, calculating a first vertical coordinate of the real-time bullet screen on the longitudinal plane of the bullet screen layer according to a first longitudinal formula, where the preset spacing is a preset minimum spacing between two adjacent bullet screens that does not affect watching effect of the target video; or if the preset spacing is greater than or equal to the first spacing, and the preset spacing is less than or equal to the second spacing, calculating a second vertical coordinate of the real-time bullet screen on the longitudinal plane of the bullet screen layer according to a second longitudinal formula; or if the preset spacing is greater than the second spacing, calculating a third vertical coordinate of the real-time bullet screen on the longitudinal plane of the bullet screen layer according to a third longitudinal formula.

Figure 2C:
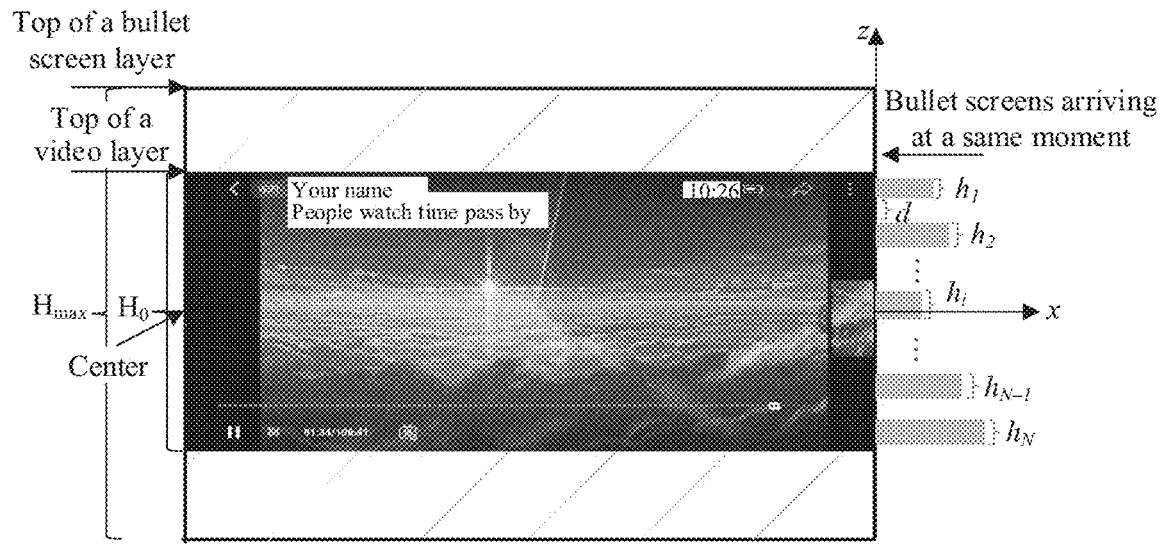
FIG. 2C is a schematic diagram of coordinates of bullet screens that arrive at a same moment and move longitudinally according to an embodiment of this application.

To better understand the optional implementation, also refer to FIG. 2C. FIG. 2C is a schematic diagram of coordinates of bullet screens that arrive at a same moment and move longitudinally according to an embodiment of this application. As shown in FIG. 2C, a coordinate system is drawn by using a center of the video layer as an origin of coordinates. N is a quantity of real-time bullet screens that arrive at the real-time play time (that is, the same moment), $h_i$ is a bullet screen height of an $i^{th}$ real-time bullet screen, $H_0$ is the height of the video layer (that is, the first height), $H_{max}$ is the height of the bullet screen layer (that is, the second height), and d is a spacing between two adjacent real-time bullet screens. When bullet screens arriving at the same moment are sparse, the spacing d is relatively large. When bullet screens arriving at the same moment are dense, the spacing d is relatively small.

A preset spacing $d_{min}$ may be set in advance through a plurality of experiments. $d_{min}$ is a minimum spacing between two adjacent bullet screens that does not affect watching effect of the target video, and can enable the user to obtain optimal watching experience of the bullet screens+the video, so that the bullet screens are not dense due to an excessively small spacing between the bullet screens, and watching of the video content is not affected.

Based on the parameters in FIG. 2C, a maximum spacing (that is, the first spacing):

$$\frac{H_0 - \sum_{i=1}^{N} h_i}{N-1}$$

between two adjacent bullet screens that is allowed by a region of the video layer may be calculated. In addition, a maximum spacing (that is, the second spacing):

$$\frac{H_{max} - \sum_{i=1}^{N} h_i}{N-1}$$

between two adjacent bullet screens that is allowed by a region of the bullet screen layer may be calculated. Based on a size relationship between the first spacing, the second spacing, and the preset spacing, a quantity of bullet screens that arrive at a particular moment may be classified into three scenarios: a sparse bullet screen scenario, a peak bullet screen scenario, and an ultra-dense bullet screen scenario.

Scenario 1: Sparse Bullet Screen Scenario

If $$d_{min} \le \frac{H_0 - \sum_{i=1}^{N} h_i}{N-1},$$

it indicates that the height of the video layer is sufficient to cover these bullet screens on the premise that a user experience indicator $d_{min}$ is met. In this case, arriving bullet screens are relatively sparse. Based on the parameters in FIG. 2C, the first vertical coordinate may be calculated by using the following first longitudinal formula:

the first longitudinal formula is:

$$z_i = \frac{H_0}{2} - \left[\sum_{j=1}^{i-1} h_j + (i-1) \cdot d\right],$$

where $$d \in \left[d_{min}, \frac{H_0 - \sum_{i=1}^{N} h_i}{N-1}\right].$$

An optimal longitudinal spacing between bullet screens may be adjusted in a range $$\left[d_{min}, \frac{H_0 - \sum_{i=1}^{N} h_i}{N-1}\right].$$

After d is determined, the first vertical coordinate $z_i$ corresponding to the bullet screen i may be calculated.

Figure 2D:
FIG. 2D is a schematic diagram of bullet screen distribution in a sparse bullet screen scenario according to an embodiment of this application.

In the sparse bullet screen scenario, there is no need to split bullet screens to two sides of the newly extended bullet screen layer, and all bullet screens only need to be aligned with the top of the video layer and distributed longitudinally downward, as shown in FIG. 2D. An oblique dashed line range in the middle is a real-time coverage of the bullet screens.

Scenario 2: Peak Bullet Screen Scenario

In a case of $$\frac{H_0 - \sum_{i=1}^{N} h_i}{N-1} \le d_{min} \le \frac{H_{max} - \sum_{i=1}^{N} h_i}{N-1},$$

bullet screens arriving at the same moment are relatively dense. If all bullet screens are split on the video layer, the bullet screens are excessively dense, and user experience is poor. However, if the height of the bullet screen layer is sufficient to meet the user experience indicator $d_{min}$, the bullet screens are split to the bullet screen layer, so that a density can be reduced, and user experience can be improved. Based on the parameters in FIG. 2C, the second vertical coordinate may be calculated according to the following second longitudinal formula:

the second longitudinal formula is:

$$z_i = \frac{1}{2}\left[\sum_{j=1}^{N} h_j + (N-1) \cdot d\right] - \left[\sum_{j=1}^{i-1} h_j + (i-1) \cdot d\right],$$

where $$d \in \left[\frac{H_0 - \sum_{i=1}^{N} h_i}{N-1}, \frac{H_{max} - \sum_{i=1}^{N} h_i}{N-1}\right].$$

The optimal longitudinal spacing between bullet screens may be adjusted within a range $$\left[\frac{H_0 - \sum_{i=1}^{N} h_i}{N-1}, \frac{H_{max} - \sum_{i=1}^{N} h_i}{N-1}\right].$$

After d is determined, the second vertical coordinate $z_i$ corresponding to the bullet screen i may be calculated.

Figure 2E:
FIG. 2E is a schematic diagram of bullet screen distribution in a peak bullet screen scenario according to an embodiment of this application.

In the peak bullet screen scenario, all bullet screens may be split from a center of the screen to two sides in a vertical direction until the bullet screens are split to the bullet screen layer on the two sides in the vertical direction, as shown in FIG. 2E. An oblique dashed line range in the middle is a real-time coverage of the bullet screens.

Scenario 3: Ultra-Dense Bullet Screen Scenario

In a case of $$\frac{H_{max} - \sum_{i=1}^{N} h_i}{N-1} < d_{min},$$

bullet screens that arrive at the same moment are quite dense. As a result, when the bullet screens are split to the bullet screen layer, the height of the bullet screen layer still cannot disperse all bullet screens longitudinally to the greatest extent. Based on the parameters in FIG. 2C, the third vertical coordinate may be calculated by using the following third longitudinal formula:

the third longitudinal formula is:

$$z_i = \frac{1}{2}\left[\sum_{j=1}^{N} h_j + (N-1)\cdot d\right] - \left[\sum_{j=1}^{i-1} h_j + (i-1)\cdot d\right],$$

where $$d = \frac{H_{max} - \sum_{i=1}^{N} h_i}{N-1}.$$

The optimal longitudinal spacing between bullet screens can only be a maximum spacing $$\frac{H_{max} - \sum_{i=1}^{N} h_i}{N-1}$$

allowed by the bullet screen layer.

Figure 2F:
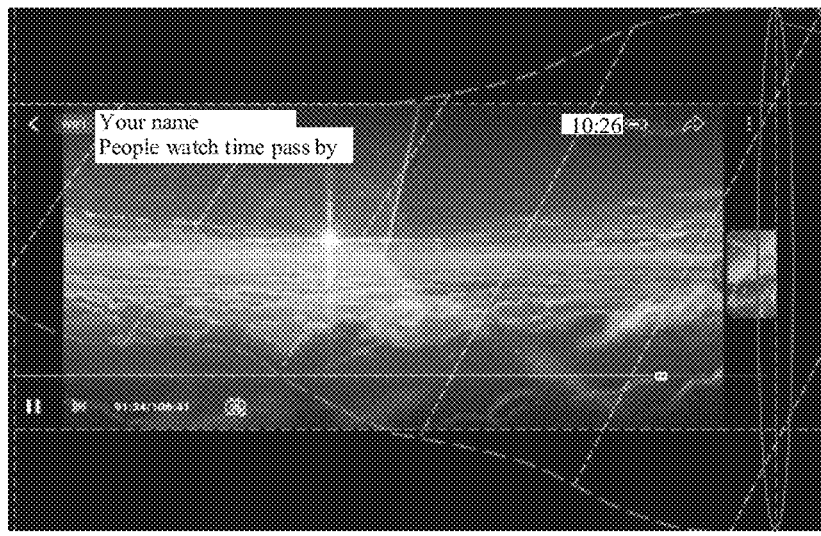
FIG. 2F is a schematic diagram of bullet screen distribution in an ultra-dense bullet screen scenario according to an embodiment of this application.

In the ultra-dense bullet screen scenario, the bullet screens need to cover the height of the entire bullet screen layer at a cost of sacrificing a spacing between bullet screens, as shown in FIG. 2F. An oblique dashed line range in the middle is a real-time coverage of the bullet screens.

Figure 2G:
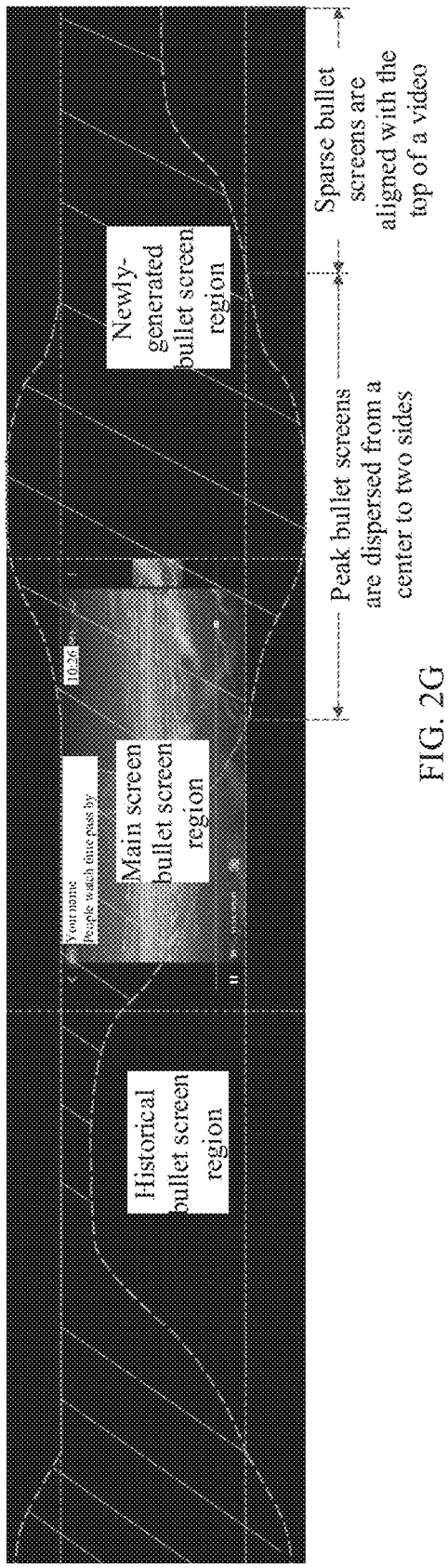
FIG. 2G is a schematic diagram of bullet screen distribution after an annular bullet screen layer is extended according to an embodiment of this application.

FIG. 2G is a schematic diagram of bullet screen distribution after an annular bullet screen layer is extended according to an embodiment of this application. As shown in FIG. 2G, an oblique dashed line range surrounded by boundaries is a real-time coverage of bullet screens in the regions (the newly-generated bullet screen region, the main screen bullet screen region, and the historical bullet screen region). The real-time bullet screen appears from the newly-generated bullet screen region, then moves to the main screen bullet screen region, and then moves to the historical bullet screen region and disappears. When bullet screens at the same moment are relatively sparse, the bullet screens are distributed in the manner in which "sparse bullet screens are aligned with the top of the video". When bullet screens at the same moment are relatively dense, the bullet screens are distributed in the manner in which "peak bullet screens are extended from the center of the screen to the two sides".

In an optional implementation, when real-time bullet screens are split longitudinally, distribution may be further performed by using features such as a quantity of likes and a bullet screen height of each bullet screen. For example, bullet screens with larger quantities of likes and smaller heights are concentrated to a center of the vertical direction of the screen, and bullet screens with smaller quantities of likes and larger heights are split to the two sides of the bullet screen layer. In this way, bullet screens with relatively low value can be split to the two sides, and bullet screens with relatively high value can be concentrated at the center of the video layer, to optimize user experience.

S210: The electronic device refreshes and plays the real-time bullet screen on the bullet screen layer based on the three-dimensional coordinates.

In the method described in FIG. 2, a VR virtual space is fully used to add the annular transparent bullet screen layer to the preset orientation of the video layer, so that the regional area of the bullet screen layer is greater than the regional area of the video layer, to implement longitudinal extension and splitting and horizontal extension of bullet screens in space, and eliminate of a limitation of the screen of the electronic device, thereby making a proportion of bullet screens greater than or equal to 100%. In addition, compared with an original bullet screen region, a new bullet screen region is extended longitudinally, and may be used to implement longitudinal dispersion of bullet screens during peak hours, so that the user enjoys content of a wonderful video clip when experiencing bullet screens during peak hours. In addition, a new bullet screen region is also extended horizontally on the bullet screen layer. When the user turns the head to the right, the user may watch the newly generated bullet screen in advance in the newly-generated bullet screen region, so that the user has a feeling of expectation. When the user turns the head to the left, the user may review a historical bullet screen in the historical bullet screen region, so that the user has a feeling of nostalgia. Bullet screens can be split longitudinally, to reduce pressure of a bullet screen peak, and improve watching effect of video content. In addition, a rendering form of bullet screens can also be enriched, to improve user experience.

The foregoing descriptions are merely specific implementations of this application, but are not intended to limit the protection scope of this application. A person of ordinary skill in the art may further make improvements without departing from the creative concept of this application, but all these shall fall within the protection scope of this application.

Figure 3:
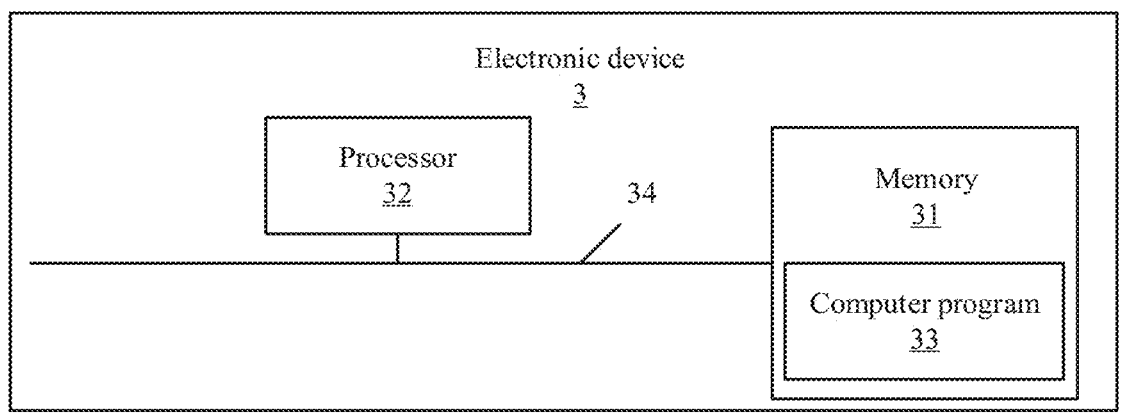
FIG. 3 is a schematic diagram of a structure of an electronic device according to an embodiment of this application.

FIG. 3 is a schematic diagram of a structure of an electronic device according to an embodiment of this application. The electronic device 3 includes a memory 31, at least one processor 32, a computer program 33 that is stored in the memory 31 and that can run on the at least one processor 32, and at least one communication bus 34.

A person skilled in the art may understand that the schematic diagram shown in FIG. 3 is merely an example of the electronic device 3, and does not constitute a limitation on the electronic device 3. The electronic device 3 may include more or fewer components than those shown in the figure, or combine some components, or have different component arrangements. For example, the electronic device 3 may further include an input/output device, a network access device, and the like.

The at least one processor 32 may be a central processing unit (Central Processing Unit, CPU), or may be another general purpose processor, a digital signal Processor (Digital Signal Processor, DSP), an application specific integrated circuit (Application Specific Integrated Circuit, ASIC), a field-programmable gate array (Field-programmable Gate Array, FPGA) or another programmable logic device, a discrete gate or transistor logic device, or a discrete hardware component. The processor 32 may be a microprocessor, or the processor 32 may be any conventional processor, or the like. The processor 32 is a control center of the electronic device 3, and is connected to all parts of the entire electronic device 3 by using various interfaces and lines.

The memory 31 may be configured to store the computer program 33 and/or modules/units. The processor 32 implements various functions of the electronic device 3 by running or executing the computer program and/or the modules/units stored in the memory 31 and invoking data stored in the memory 31. The memory 31 may mainly include a program storage region and a data storage region. The program storage region may store an operating system, an application required by at least one function (such as a sound play function and an image play function), and the like. The data storage region may store data (for example, audio data) created based on use of the electronic device 3, and the like. In addition, the memory 31 may include a non-volatile memory and a volatile memory, for example, a hard disk, a memory, a plug-connected hard disk, a smart media card (Smart Media Card, SMC), a secure digital (Secure Digital, SD) card, a flash memory card (Flash Card), at least one magnetic disk storage device, a flash memory device, or another storage device.

The electronic device described in this embodiment of this application may be configured to implement some or all of the procedures in the method embodiment described in FIG. 2 of this application. Refer to related descriptions in the foregoing embodiment in FIG. 2. Details are not described herein again.

An embodiment of this application further provides a computer-readable storage medium. The computer-readable storage medium stores instructions. When the instructions run on a processor, the method procedure shown in FIG. 2 is implemented.

An embodiment of this application further provides a computer program product. When the computer program product runs on a processor, the method procedure shown in FIG. 2 is implemented.

Methods or algorithm steps described in combination with the content disclosed in embodiments of this application may be implemented by hardware, or may be implemented by a processor by executing a software instruction. The software instruction may include a corresponding software module. The software module may be stored in a random access memory (Random Access Memory, RAM), a flash memory, a read only memory (Read Only Memory, ROM), an erasable programmable read only memory (Erasable Programmable ROM, EPROM), an electrically erasable programmable read only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may alternatively be a component of the processor. The processor and the storage medium may be located in an ASIC. In addition, the ASIC may be located in an electronic device. Certainly, the processor and the storage medium may exist in the electronic device as discrete components.

A person of ordinary skill in the art may understand that all or some of the procedures of the methods in embodiments may be completed by a computer program indicating related hardware. The program may be stored in a computer-readable storage medium. When the program is executed, the procedures of the methods in embodiments may be performed. The foregoing storage medium includes any medium that can store program code, such as a ROM, a RAM, a magnetic disk, or an optical disc.

What is claimed is:

1. A bullet screen play method, comprising:

receiving a bullet screen enabling instruction for a target video, wherein the bullet screen enabling instruction instructs playing of a bullet screen in a virtual reality (VR) bullet screen manner;

drawing an annular transparent bullet screen layer in a preset orientation of a video layer of the target video in response to the bullet screen enabling instruction, wherein a first height of the video layer is less than a second height of the bullet screen layer;

obtaining bullet screen information of a real-time bullet screen of the target video;

calculating three-dimensional coordinates of the real-time bullet screen on the bullet screen layer based on the bullet screen information; and refreshing and playing the real-time bullet screen on the bullet screen layer based on the three-dimensional coordinates.

2. The bullet screen play method according to claim 1, wherein after the drawing an annular transparent bullet screen layer in a preset orientation of a video layer of the target video, the bullet screen play method further comprises:

dividing the bullet screen layer into a newly-generated bullet screen region, a main screen bullet screen region, and a historical bullet screen region, wherein the real-time bullet screen crosses the newly-generated bullet screen region, the main screen bullet screen region, and the historical bullet screen region at a constant speed;

initializing a bullet screen set in the newly-generated bullet screen region;

determining that initialization of the bullet screen set in the newly-generated bullet screen region is completed; and in response to a determination that the initialization of the bullet screen set in the newly-generated bullet screen region is completed, obtaining the bullet screen information of the real-time bullet screen of the target video.

3. The bullet screen play method according to claim 2, wherein the initializing a bullet screen set in the newly-generated bullet screen region comprises:

calculating an initialization time domain;

obtaining the bullet screen set in the newly-generated bullet screen region within the initialization time domain;

calculating initialization coordinates of each bullet screen in the bullet screen set; and displaying each bullet screen in the bullet screen set in the newly-generated bullet screen region based on the initialization coordinates.

4. The bullet screen play method according to claim 3, wherein the initialization time domain is: $[0, \Delta t_1]$, wherein $$\Delta t_1 = \frac{(\alpha+\beta)\cdot\pi\cdot R}{180\cdot v};$$

and
the initialization coordinates are:

$$\binom{x}{y} = \begin{pmatrix} R\cdot\cos\left[\alpha\cdot\left(1-\frac{t}{\Delta t_1-\Delta t_0}\right)\right] \\ R\cdot\sin\left[\alpha\cdot\left(1-\frac{t}{\Delta t_1-\Delta t_0}\right)\right] \end{pmatrix},$$

wherein $$\Delta t_0 = \frac{\beta\cdot\pi\cdot R}{180\cdot v},$$

wherein
v is a bullet screen movement speed, R is a radius of the bullet screen layer, $\alpha$ is an included angle between an entrance of the main screen bullet screen region and a horizontal direction, $\beta$ is an included angle between a bullet screen generation position and the horizontal direction, and $\tau$ is a particular moment.

5. The bullet screen play method according to claim 2, wherein:
the bullet screen information comprises a bullet screen movement speed, a real-time play time, and a bullet screen height; and
the calculating three-dimensional coordinates of the real-time bullet screen on the bullet screen layer based on the bullet screen information comprises:
calculating, at the real-time play time based on the bullet screen movement speed, a horizontal coordinate of the real-time bullet screen on a horizontal plane of the bullet screen layer; and
calculating, at the real-time play time based on the bullet screen height, a vertical coordinate of the real-time bullet screen on a longitudinal plane of the bullet screen layer.

6. The bullet screen play method according to claim 5, wherein the calculating, at the real-time play time based on the bullet screen movement speed, a horizontal coordinate of the real-time bullet screen on a horizontal plane of the bullet screen layer comprises:
calculating, based on the bullet screen movement speed, a first time domain corresponding to the newly-generated bullet screen region; and
in response to a determination that the real-time play time is within the first time domain, calculating a first horizontal coordinate of the real-time bullet screen in the newly-generated bullet screen region according to a first horizontal formula.

7. The bullet screen play method according to claim 5, wherein the calculating, at the real-time play time based on the bullet screen movement speed, a horizontal coordinate of the real-time bullet screen on a horizontal plane of the bullet screen layer comprises:
calculating, based on the bullet screen movement speed, a second time domain corresponding to the main screen bullet screen region; and
in response to a determination that the real-time play time is in the second time domain, calculating a second horizontal coordinate of the real-time bullet screen in the main screen bullet screen region according to a second horizontal formula.

8. The bullet screen play method according to claim 5, wherein the calculating, at the real-time play time based on the bullet screen movement speed, a horizontal coordinate of the real-time bullet screen on a horizontal plane of the bullet screen layer comprises:
calculating, based on the bullet screen movement speed, a third time domain corresponding to the historical bullet screen region; and
in response to a determination that the real-time play time is within the third time domain, calculating a third horizontal coordinate of the real-time bullet screen in the historical bullet screen region according to a third horizontal formula.

9. The bullet screen play method according to claim 5, wherein the calculating, at the real-time play time based on the bullet screen height, a vertical coordinate of the real-time bullet screen on a longitudinal plane of the bullet screen layer comprises:
collecting statistics on a quantity of real-time bullet screens within the real-time play time;
calculating a first spacing based on the quantity, a bullet screen height of each real-time bullet screen, and the first height of the video layer; and
in response to a determination that a preset spacing is less than or equal to the first spacing, calculating a first vertical coordinate of the real-time bullet screen on the longitudinal plane of the bullet screen layer according to a first longitudinal formula, wherein the preset spacing is a preset minimum spacing between two adjacent bullet screens that does not affect watching effect of the target video.

10. The bullet screen play method according to claim 5, wherein the calculating, at the real-time play time based on the bullet screen height, a vertical coordinate of the real-time bullet screen on a longitudinal plane of the bullet screen layer comprises:
collecting statistics on a quantity of real-time bullet screens within the real-time play time;
calculating a first spacing based on the quantity, a bullet screen height of each real-time bullet screen, and the first height of the video layer; and
in response to a determination that the preset spacing is greater than or equal to the first spacing, and the preset spacing is less than or equal to a second spacing, calculating a second vertical coordinate of the real-time bullet screen on the longitudinal plane of the bullet screen layer according to a second longitudinal formula.

11. The bullet screen play method according to claim 5, wherein the calculating, at the real-time play time based on the bullet screen height, a vertical coordinate of the real-time bullet screen on a longitudinal plane of the bullet screen layer comprises:
collecting statistics on a quantity of real-time bullet screens within the real-time play time;
calculating a second spacing based on the quantity, a bullet screen height of each real-time bullet screen, and the second height of the bullet screen layer, and
in response to a determination that the preset spacing is greater than the second spacing, calculating a third vertical coordinate of the real-time bullet screen on the longitudinal plane of the bullet screen layer according to a third longitudinal formula.

12. The bullet screen play method according to claim 1, wherein the drawing an annular transparent bullet screen layer in a preset orientation of a video layer of the target video in response to the bullet screen enabling instruction comprises:
   outputting a bullet screen layer editing page in response to the bullet screen enabling instruction;
   receiving a bullet screen layer drawing parameter input on the bullet screen layer editing page; and
   drawing the annular transparent bullet screen layer in the preset orientation of the video layer of the target video based on the bullet screen layer drawing parameter.

13. An electronic device, comprising:
   at least one processor; and
   one or more memories coupled to the at least one processor and storing programming instructions for execution by the at least one processor to perform operations comprising:
      receiving a bullet screen enabling instruction for a target video, wherein the bullet screen enabling instruction instructs playing of a bullet screen in a virtual reality (VR) bullet screen manner;
      drawing an annular transparent bullet screen layer in a preset orientation of a video layer of the target video in response to the bullet screen enabling instruction, wherein a first height of the video layer is less than a second height of the bullet screen layer;
      obtaining bullet screen information of a real-time bullet screen of the target video;
      calculating three-dimensional coordinates of the real-time bullet screen on the bullet screen layer based on the bullet screen information; and
      refreshing and playing the real-time bullet screen on the bullet screen layer based on the three-dimensional coordinates.

14. The electronic device according to claim 13, wherein after the drawing an annular transparent bullet screen layer in a preset orientation of a video layer of the target video, the one or more memories store the programming instructions for execution by the at least one processor to perform operations comprising:
   dividing the bullet screen layer into a newly-generated bullet screen region, a main screen bullet screen region, and a historical bullet screen region, wherein the real-time bullet screen crosses the newly-generated bullet screen region, the main screen bullet screen region, and the historical bullet screen region at a constant speed;
   initializing a bullet screen set in the newly-generated bullet screen region;
   determining that initialization of the bullet screen set in the newly-generated bullet screen region is completed; and
   in response to a determination that the initialization of the bullet screen set in the newly-generated bullet screen region is completed, obtaining the bullet screen information of the real-time bullet screen of the target video.

15. The electronic device according to claim 14, wherein the initializing a bullet screen set in the newly-generated bullet screen region comprises:
   calculating an initialization time domain;
   obtaining the bullet screen set in the newly-generated bullet screen region within the initialization time domain;
   calculating initialization coordinates of each bullet screen in the bullet screen set; and
   displaying each bullet screen in the bullet screen set in the newly-generated bullet screen region based on the initialization coordinates.

16. The electronic device according to claim 14, wherein:
   the bullet screen information comprises a bullet screen movement speed, a real-time play time, and a bullet screen height; and
   the calculating three-dimensional coordinates of the real-time bullet screen on the bullet screen layer based on the bullet screen information comprises:
      calculating, at the real-time play time based on the bullet screen movement speed, a horizontal coordinate of the real-time bullet screen on a horizontal plane of the bullet screen layer; and
      calculating, at the real-time play time based on the bullet screen height, a vertical coordinate of the real-time bullet screen on a longitudinal plane of the bullet screen layer.

17. The electronic device according to claim 16, wherein the calculating, at the real-time play time based on the bullet screen movement speed, a horizontal coordinate of the real-time bullet screen on a horizontal plane of the bullet screen layer comprises:
   calculating, based on the bullet screen movement speed, a first time domain corresponding to the newly-generated bullet screen region, a second time domain corresponding to the main screen bullet screen region, and a third time domain corresponding to the historical bullet screen region; and
   in response to a determination that the real-time play time is within the first time domain, calculating a first horizontal coordinate of the real-time bullet screen in the newly-generated bullet screen region according to a first horizontal formula; or
   in response to a determination that the real-time play time is in the second time domain, calculating a second horizontal coordinate of the real-time bullet screen in the main screen bullet screen region according to a second horizontal formula; or
   in response to a determination that the real-time play time is within the third time domain, calculating a third horizontal coordinate of the real-time bullet screen in the historical bullet screen region according to a third horizontal formula.

18. The electronic device according to claim 16, wherein the calculating, at the real-time play time based on the bullet screen height, a vertical coordinate of the real-time bullet screen on a longitudinal plane of the bullet screen layer comprises:
   collecting statistics on a quantity of real-time bullet screens within the real-time play time;
   calculating a first spacing based on the quantity, a bullet screen height of each real-time bullet screen, and the first height of the video layer;
   calculating a second spacing based on the quantity, a bullet screen height of each real-time bullet screen, and the second height of the bullet screen layer, and
   in response to a determination that a preset spacing is less than or equal to the first spacing, calculating a first vertical coordinate of the real-time bullet screen on the longitudinal plane of the bullet screen layer according to a first longitudinal formula, wherein the preset spacing is a preset minimum spacing between two adjacent bullet screens that does not affect watching effect of the target video; or
   in response to a determination that the preset spacing is greater than or equal to the first spacing, and the preset spacing is less than or equal to the second spacing, calculating a second vertical coordinate of the real-time bullet screen on the longitudinal plane of the bullet screen layer according to a second longitudinal formula; or in response to a determination that the preset spacing is greater than the second spacing, calculating a third vertical coordinate of the real-time bullet screen on the longitudinal plane of the bullet screen layer according to a third longitudinal formula.

19. The electronic device according to claim 13, wherein the drawing an annular transparent bullet screen layer in a preset orientation of a video layer of the target video in response to the bullet screen enabling instruction comprises:

outputting a bullet screen layer editing page in response to the bullet screen enabling instruction;

receiving a bullet screen layer drawing parameter input on the bullet screen layer editing page; and drawing the annular transparent bullet screen layer in the preset orientation of the video layer of the target video based on the bullet screen layer drawing parameter.

20. A non-transitory computer readable medium which storing computer-executable instructions for execution by at least one processor to perform operations comprising:

receiving a bullet screen enabling instruction for a target video, wherein the bullet screen enabling instruction instructs playing of a bullet screen in a virtual reality (VR) bullet screen manner;

drawing an annular transparent bullet screen layer in a preset orientation of a video layer of the target video in response to the bullet screen enabling instruction, wherein a first height of the video layer is less than a second height of the bullet screen layer;

obtaining bullet screen information of a real-time bullet screen of the target video;

calculating three-dimensional coordinates of the real-time bullet screen on the bullet screen layer based on the bullet screen information; and refreshing and playing the real-time bullet screen on the bullet screen layer based on the three-dimensional coordinates.

* * * * *